(12) United States Patent
Mårtensson

(10) Patent No.: US 9,111,351 B2
(45) Date of Patent: Aug. 18, 2015

(54) MINIMIZING DRIFT USING DEPTH CAMERA IMAGES

(71) Applicant: Linus Mårtensson, Löddeköpinge (SE)

(72) Inventor: Linus Mårtensson, Löddeköpinge (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 435 days.

(21) Appl. No.: 13/688,741

(22) Filed: Nov. 29, 2012

(65) Prior Publication Data

US 2013/0156264 A1    Jun. 20, 2013

Related U.S. Application Data

(60) Provisional application No. 61/570,975, filed on Dec. 15, 2011.

(51) Int. Cl.
*G06K 9/00* (2006.01)
*G06T 7/00* (2006.01)

(52) U.S. Cl.
CPC ............. *G06T 7/0075* (2013.01); *G06T 7/0042* (2013.01); *G06T 2207/10012* (2013.01); *G06T 2207/30244* (2013.01)

(58) Field of Classification Search
CPC ..................................................... G06T 7/0075
USPC ................................................. 382/103, 154
See application file for complete search history.

(56) References Cited

U.S. PATENT DOCUMENTS

| 4,988,189 | A | * | 1/1991 | Kroupa et al. | 356/4.03 |
| 6,005,987 | A | * | 12/1999 | Nakamura et al. | 382/294 |
| 6,771,818 | B1 | * | 8/2004 | Krumm et al. | 382/225 |
| 6,989,754 | B2 | * | 1/2006 | Kisacanin et al. | 340/576 |
| 7,372,977 | B2 | * | 5/2008 | Fujimura et al. | 382/103 |
| 7,675,655 | B2 | * | 3/2010 | Marshall et al. | 358/486 |
| 2004/0100557 | A1 | * | 5/2004 | Roberts et al. | 348/169 |
| 2013/0016879 | A1 | * | 1/2013 | Baele et al. | 382/103 |
| 2013/0051612 | A1 | * | 2/2013 | Prokhorov et al. | 382/103 |
| 2013/0156264 | A1 | * | 6/2013 | Martensson | 382/103 |
| 2013/0162785 | A1 | * | 6/2013 | Michot et al. | 348/50 |
| 2013/0251197 | A1 | * | 9/2013 | Liu et al. | 382/103 |
| 2014/0043436 | A1 | * | 2/2014 | Bell et al. | 348/46 |
| 2015/0055828 | A1 | * | 2/2015 | Zhao et al. | 382/103 |

* cited by examiner

*Primary Examiner* — Gandhi Thirugnanam
(74) *Attorney, Agent, or Firm* — Snyder, Clark, Lesch & Chung, LLP

(57) ABSTRACT

A device may obtain, from a camera associated with a reference object, depth image data including objects in a first frame and a second frame; identify features of the objects in the first frame and the second frame; and track movements of the features between the first frame and the second frame. The device may also identify independently moving features in the second frame, based on the tracking movements; remove the independently moving features from the depth image data to obtain a static feature set; and process the depth image data corresponding to the static feature set to detect changes in the relative position of objects in the first frame and the second frame. The processor may further translate the changes in relative position into corresponding movement data of the camera and provide the corresponding movement data to an inertial navigation system.

19 Claims, 8 Drawing Sheets

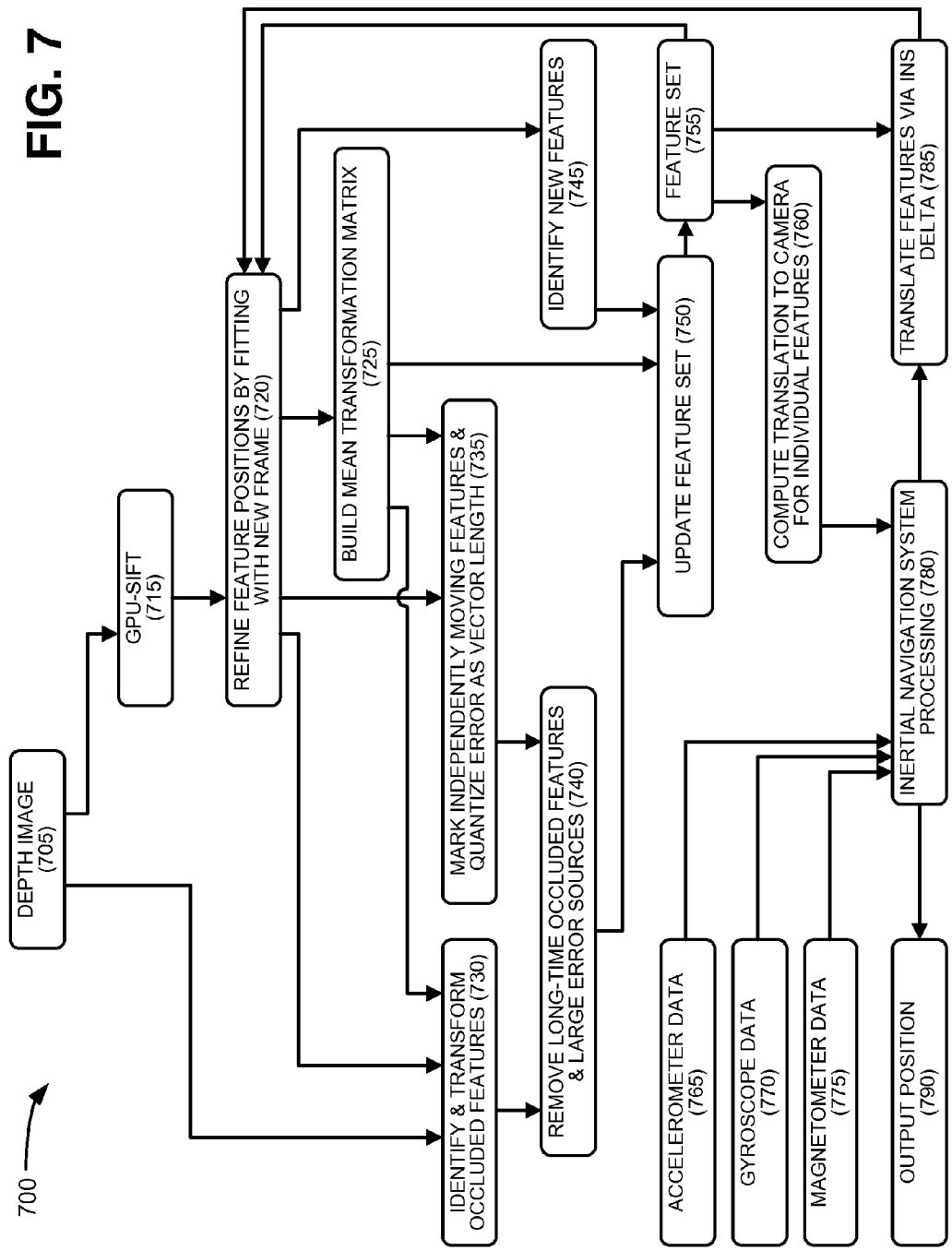

MINIMIZING DRIFT USING DEPTH CAMERA IMAGES

CROSS-REFERENCE TO RELATED APPLICATION

This application claims priority under 35. U.S.C. §119, based on U.S. Provisional Patent Application No. 61/570,975 filed Dec. 15, 2011, the disclosure of which is hereby incorporated by reference herein.

BACKGROUND

When using standard Inertial Navigation Systems (INS), the issue of drift can be prevalent to the extent that it can be a problem for normal usage. Updated INS positions are calculated with respect to a previously calculated position, and thus errors in either sensor data or position calculations can be magnified over successive iterations. In some cases, the INS position can be periodically corrected by input from some other type of navigation system, such as global positioning systems (GPS). However, input from other navigations systems is not always available or accurate enough for some systems.

SUMMARY

According to one aspect, a method may be performed by a computing device. The method may include receiving, from a depth camera associated with a reference object, depth image data including objects in a first frame and in a second frame. The method may also include processing the depth image data to detect changes in relative positions of the objects in the first frame and in the second frame, and translating the changes in the relative positions into corresponding movement data of the depth camera. The method may also include obtaining sensor data associated with the reference object and filtering the corresponding movement data and the sensor data. The method may further include calculating a geographic position of the reference object based on the corresponding movement data and the sensor data.

Additionally, processing the depth image data may include detecting edges of objects in the first frame, defining triangles between portions of edges within the first frame, detecting the edges of the objects in the second frame, defining triangles between the portions of the edges within the second frame, and calculating a mean transformation over the triangles of the first frame and the triangles of the second frame to determine the changes in the relative position.

Additionally, processing the depth image data may include defining a feature set based on the first frame and the second frame, identify common features in the feature set that are in both the first frame and the second frame, tracking relative movement, of the common features, between the first frame and the second frame, and calculating a mean transformation of the relative movement to determine the changes in the relative position.

Additionally, processing the depth image data may further include removing, from the feature set, features associated with non-static objects.

Additionally, processing the depth image data may include detecting features of the objects in the first frame, defining a feature set based on the features of the objects in the first frame, detecting features of the objects in the second frame, and updating the feature set based on the features of the objects in the second frame.

Additionally, processing the depth image data may further include updating the feature set based on the calculated geographic position of the reference object.

Additionally, the computing device may include an inertial navigation system.

Additionally, the depth camera associated with the reference object is included in an augmented reality visor.

Additionally, the sensor data associated with the reference object may include accelerometer data, gyroscope data, or magnetometer data.

Additionally, processing the depth image data may include extracting, from the depth image data, objects that are moving relative to the reference object and objects that are occluded in the second frame.

According to another aspect, a device may include a memory to store instructions and a processor. The processor may execute the instructions in the memory to obtain, from a camera associated with a reference object, depth image data including objects in a first frame and a second frame; identify features of the objects in the first frame and the second frame; and track movements of the features between the objects in the first frame and the second frame. The processor may also execute instructions in the memory to identify independently moving features in the second frame, based on the tracking movements; remove the independently moving features from the depth image data to obtain a static feature set; and process the depth image data corresponding to the static feature set to detect changes in relative positions of objects in the first frame and the second frame. The processor may further execute instructions in the memory to translate the changes in the relative positions into corresponding movement data of the camera; and provide the corresponding movement data of the camera to an inertial navigation system.

Additionally, the device may include a smart phone, a tablet computer, or an augmented reality visor.

Additionally, the processor may be further configured to obtain sensor data associated with the reference object, and calculate a geographic position of the reference object based on the corresponding movement data and the sensor data.

Additionally, the processor may be further configured to filter the corresponding movement data and the sensor data using a Kalman filter.

Additionally, the sensor data associated with the reference object may include at least one of accelerometer data, gyroscope data, and magnetometer data.

Additionally, the processor may be further configured to translate the static feature set to reflect geographic positions consistent with the calculated geographic position of the reference object.

Additionally, the processor may be further configured to identify occluded features in the second frame, based on the tracking movements, and remove the occluded features from the depth image data.

Additionally, the device may further include a Bluetooth interface, a near-field communications (NFC) interface, a WiFi interface, or a wired interface for communicating with the camera.

According to yet another aspect, a position-determining device may include a camera to generate depth images relative to a reference object, a sensor to generate sensor data, a transmitter to send the depth images and the sensor data to a processing component, and a receiver to receive the depth images and the sensor data. The sensor data may include one or more of motion data, rotation data, or magnetic field data relative to the reference object. The processing component may be configured to detect changes in relative positions of objects in the depth images; translate the changes in the relative positions into corresponding movement data of the camera; and calculate a position of the reference object based on the sensor data and the calculated corresponding movement data of the camera.

Additionally, the processing component may include an inertial navigation system.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 7 provides a further exemplary flow diagram for processing depth images according to an implementation described herein.

DETAILED DESCRIPTION

The following detailed description refers to the accompanying drawings. The same reference numbers in different drawings may identify the same or similar elements.

Systems and/or methods described herein may utilize depth camera images to provide increased precision for inertial navigation systems. Moving objects and occluded objects may be eliminated from depth images to provide a clean comparison of static objects between successive frames. The depth camera images may be compared to track the movements of points in a local environment and the movements may then be translated into corresponding movement of the depth camera. The corresponding camera movement may be provided with other sensor data for use by the inertial navigation system.

Figure 1A:
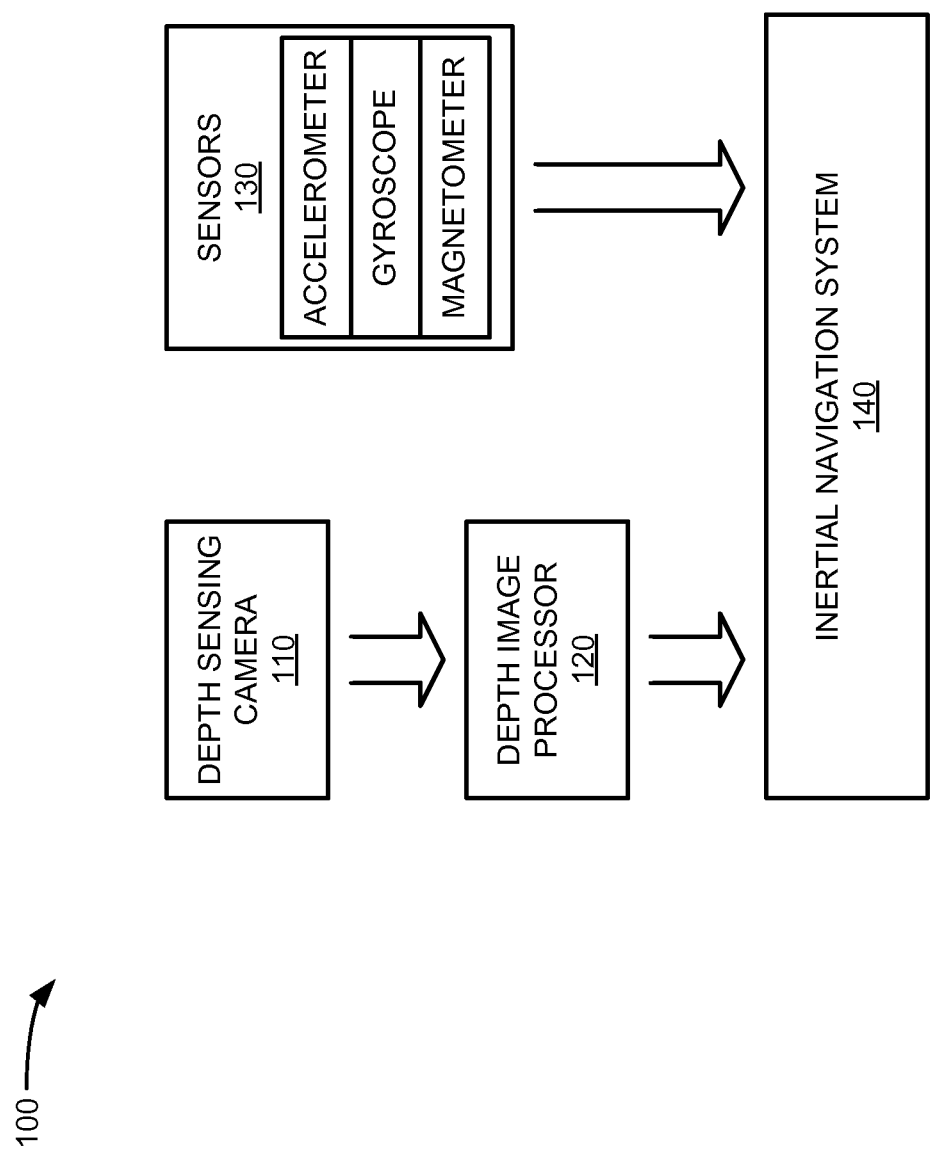
FIG. 1A provides an illustration of concepts described herein.

FIG. 1A provides an illustration of concepts described herein. A computer-aided navigation system 100 may include a depth sensing camera 110, a depth image processor 120, sensors 130, and an inertial navigation system 140.

Depth sensing camera 110 (also referred to as a "depth camera") may include a combination of hardware and software to detect distances of objects relative to camera 110. More particularly, depth sensing camera 110 may assign distances to each pixel of an image. For example, depth sensing camera 110 may transmit invisible near-infrared light and may measure the light's return path (e.g., "time-of-flight") after the light reflects off the objects to determine distances to the objects. Depth sensing camera 110 may also be referred to as a range camera, a 3D camera, a time-of-flight camera, or an RGB-D camera. In another implementation, depth sensing camera 110 may include a plenoptic camera, a computational camera, or another type of camera that enables the detection of distances between a camera and an object and/or features of an object. As used herein, the term "object" may include not only inanimate objects or things (e.g., a tree, rock, building, etc.) but also people, animals, or other living or moving objects. A "feature" may be a unique small set of pixels within an object. Features may be more easily tracked between images and are somewhat robust to changes between sequential images.

Depth image frames may be generated by depth sensing camera 110 and stored sequentially for analysis by, for example, depth image processor 120. Depth sensing camera 110 may be associated with a moving object (also referred to herein as a "reference object"). For example, depth sensing camera 110 may be integrated in a mobile device (e.g., a smart phone) carried by a person or equipment worn by a person (e.g., an Augmented Reality (AR) visor). In one implementation, depth sensing camera 110 may accurately detect an object's depth within a few centimeters or less.

Depth image processor 120 may include a computing device that includes a processor to compare images from depth sensing camera 110. In one implementation, depth image processor 120 may identify points in images that are moving (e.g., independently of depth sensing camera 110 and/or a reference object) and those points that are static. Depth image processor 120 may calculate the static points to correlate the position of depth sensing camera 110 with respect to its surroundings.

Sensors 130 may include any types of sensors used to provide information to inertial navigation system 140. Sensors 130 may include, for example, motion sensors (e.g., an accelerometer), rotation sensors (e.g., a gyroscope), and/or magnetic field sensors (e.g., a magnetometer). Sensors 130 may be associated with the same reference object as that of depth sensing camera 110. For example, sensors 130 may be include in the same mobile device as depth sensing camera 110 or mounted on the same AR visor as depth sensing camera 110.—Generally, sensors 130 should have a fixed position with respect to depth sensing camera 110 to provide a consistent set of data for determining a user's position.

Inertial navigation system 140 may include computing device and/or processing component to receive information from depth image processor 120 and sensors 130. Inertial navigation system 140 may use the information from depth image processor 120 and sensors 130 to calculate a position, orientation, and/or velocity of the reference object without using external references (e.g., a GPS or another navigation system). In one implementation, inertial navigation system 140 may filter information from depth image processor 120 and sensors 130 and calculate positions using best-fit results to improve the precision of the inertial navigation system 140 output.

Figure 1B:
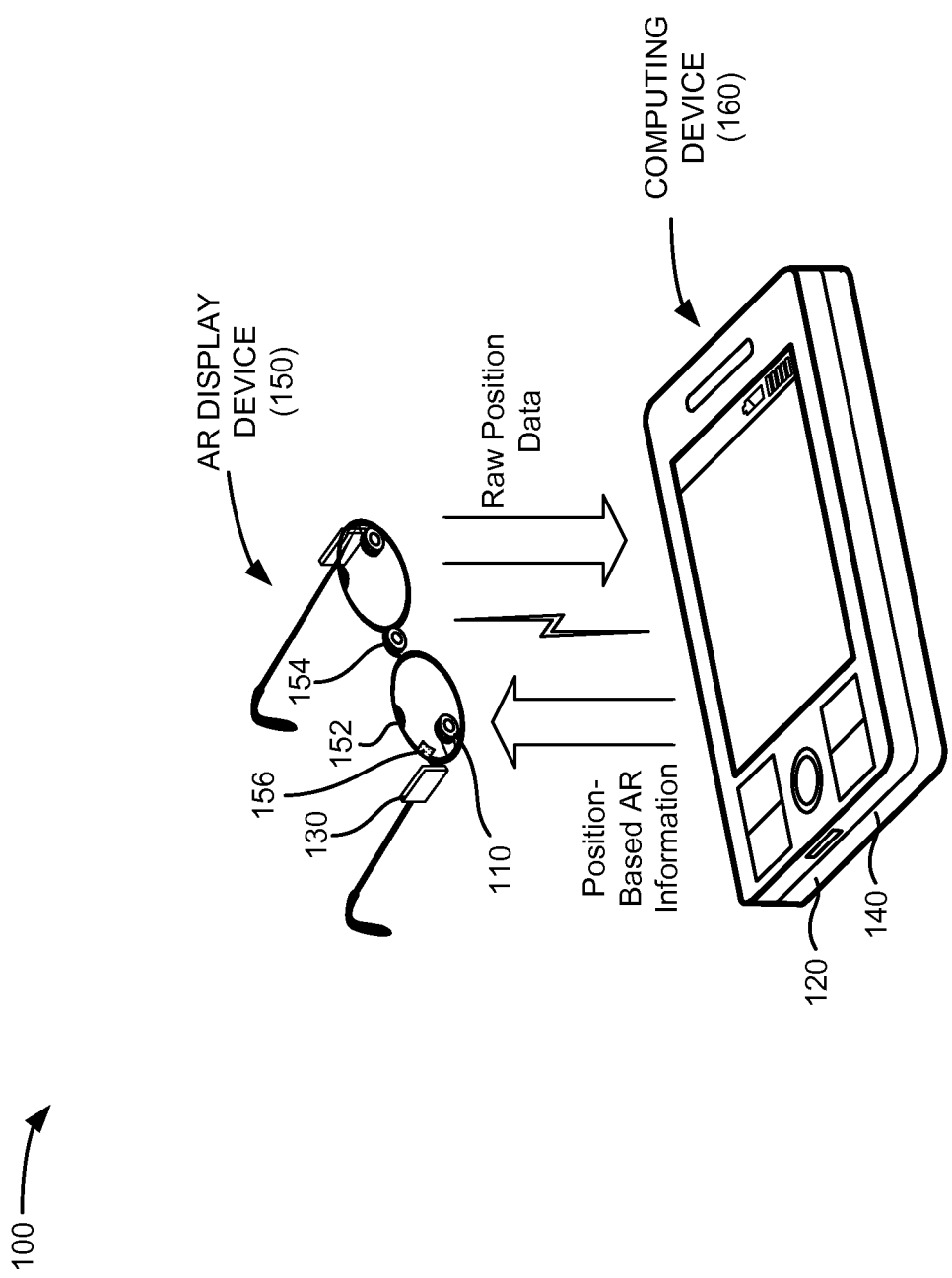
FIG. 1B shows an exemplary system in which concepts described herein may be implemented.

FIG. 1B shows an exemplary system in which concepts described herein may be implemented. An AR display device 150 may communicate with a computing device 160. The AR display device 150 may include depth sensing camera 110, sensors 130, eye camera(s) 152, front camera 154, and projector(s) 156. Depth sensing camera 110 and sensors 130 may collect depth, position, and orientation information as described above. Eye cameras 152 may track eyes to determine the direction in which a viewer that wears AR display device 150 is looking Front camera 154 may receive images (e.g., color/texture images) from surroundings. AR display device 150 may collect depth images, position/orientation information, color/texture images, eye-tracking information, and/or distance information as raw position data.

Computing device 160 may include a mobile computing device, such as a smart phone, tablet computer, a mobile gaming device console, a laptop computer, or another type of hand-held computational or communication device. In another implementation, computing device 160 may include a fixed device, such as a desktop computer or another computing device. In implementations described herein, computing device 160 may include depth image processor 120 and inertial navigation system 140.

AR display device 150 may send the raw position data to computing device 160. In implementations described herein, AR display device 150 and computing device 160 may include a short-range wireless interface, such as a Bluetooth interface, WiFi interface, near-field communications (NFC) interface, etc. In another implementation, AR display device 150 and computing device 160 may communicate over a wired interface, such as a universal serial bus (USB) interface, or be directly connected (e.g., combined in a single device). In still other implementations, AR display device 150 and computing device 160 may communicate over other wireless interfaces, such as a long-term evolution (LTE) network, an enhanced high-rate packet data (eHRPD) network, a WiMax network, etc.

In response to receiving the raw position data, computing device 160 may calculate a position associated with AR display device 150. In one implementation, Computing device 160 may use the calculated position to accurately generate additional position-based AR information. Computing device 160 may send, to AR display device 150, the position-based AR information. At AR display device 150, projectors 156 may project the AR information onto the lens-like screens. Projectors 156 may operate in combination to render three-dimensional images of the AR information in real time or near real time.

Depending on the implementation, computer-aided navigation system 100 may include additional, fewer, or a different arrangement of components than those illustrated in FIGS. 1A and 1B. For example, in other implementations, components of computer-aided navigation system 100 may be included in a single device or distributed among different devices than AR display device 150 and computing device 160, such as a backend computing device (not shown).

Figure 2:
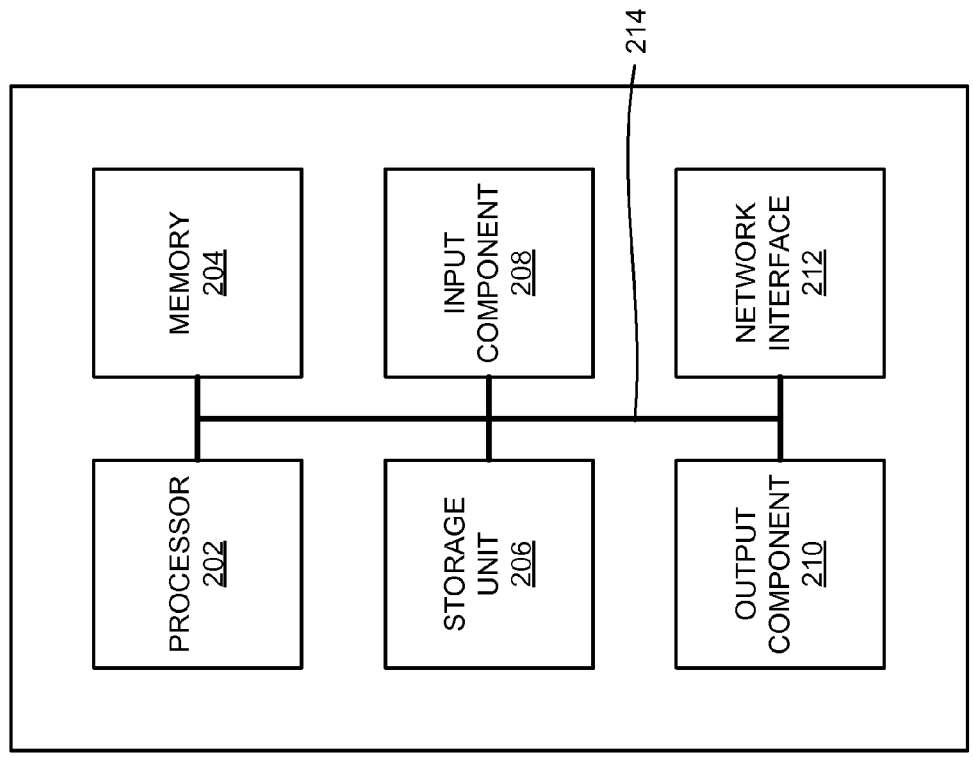
FIG. 2 is a block diagram of exemplary components of a device of FIG. 2.

FIG. 2 is a diagram illustrating exemplary components of a device 200 which may represent AR display device 150, computing device 160, or a backed computing device. As shown in FIG. 2, device 200 may include a processor 202, memory 204, storage unit 206, input component 208, output component 210, network interface 212, and communication path 214.

Processor 202 may include a processor, a microprocessor, an Application Specific Integrated Circuit (ASIC), a Field Programmable Gate Array (FPGA), and/or other processing logic (e.g., audio/video processor) capable of processing information and/or controlling device 200. Memory 204 may include static memory, such as read only memory (ROM), and/or dynamic memory, such as random access memory (RAM), or onboard cache, for storing data and machine-readable instructions. Storage unit 206 may include storage devices, such as a floppy disk, CD ROM, CD read/write (R/W) disc, and/or flash memory, as well as other types of storage devices.

Input component 208 and output component 210 may include a display screen, a keyboard, a mouse, a speaker, a microphone, a Digital Video Disk (DVD) writer, a DVD reader, Universal Serial Bus (USB) port, and/or other types of components for converting physical events or phenomena to and/or from digital signals that pertain to device 200.

Network interface 212 may include a transceiver that enables device 200 to communicate with other devices and/or systems. For example, network interface 212 may communicate via a network, such as the Internet, a terrestrial wireless network (e.g., a WLAN), a cellular network, a satellite-based network, a wireless personal area network (WPAN), etc. Additionally or alternatively, network interface 212 may include a modem, an Ethernet interface to a LAN, and/or an interface/connection for connecting device 200 to other devices (e.g., a Bluetooth interface, WiFi interface, etc.). For example, in one implementation, AR display device 150 may communicate with computing device 160 via Bluetooth interfaces.

Communication path 214 may provide an interface through which components of device 200 can communicate with one another.

In different implementations, device 200 may include additional, fewer, different, or differently arranged components than the ones illustrated in FIG. 2. For example, device 200 may include additional network interfaces, such as interfaces for receiving and sending data packets. In another example, device 200 may include a tactile input device.

Figure 3:
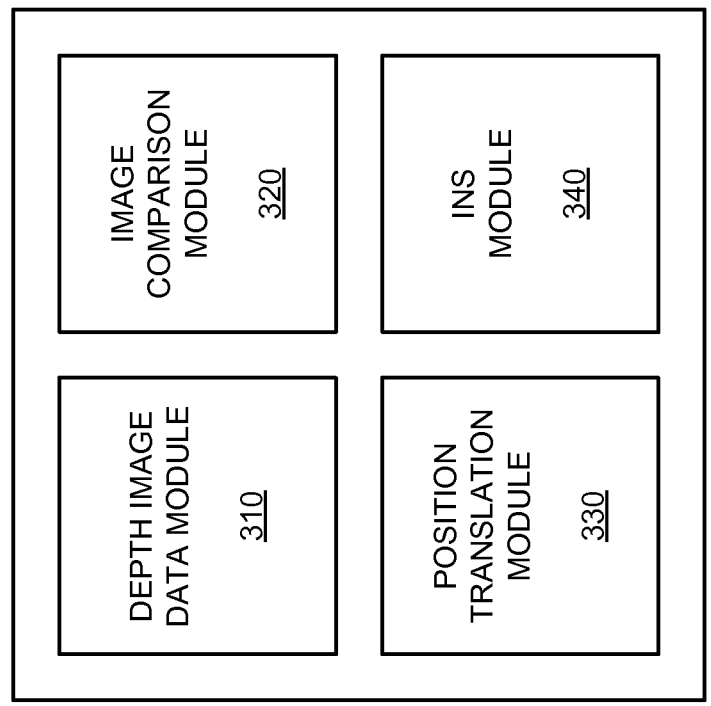
FIG. 3 is a block diagram of exemplary functional components of a mobile computing device of FIG. 2.

FIG. 3 is a block diagram of functional components of computing device 160. Functions described in connection with FIG. 4 may be performed, for example, by processor 202 executing instructions stored in memory 204. As shown in FIG. 3, computing device 160 may include a depth image data module 310, an image comparison module 320, a position translation module 330, and an inertial navigation system (INS) module 340.

Depth image data module 310 may include hardware or a combination of hardware and software to receive depth images from depth image camera 110. For example, depth image data module 310 may receive and store frames in sequence for processing by image comparison module 320. Depth image data module 310 may also store feature sets that may be identified and/or updated by image comparison module 320.

Image comparison module 320 may include hardware or a combination of hardware and software to identify moving objects and occluded objects in depth images. Image comparison module 320 may also eliminate the identified moving objects and occluded objects to provide a clean comparison of static objects for comparison between successive frames. Image comparison module 320 may compare the static objects from the camera images to track the relative movements of points in a local environment.

Position translation module 330 may include hardware or a combination of hardware and software to translate relative movements detected by image comparison module 320 into corresponding movements of the depth sensing camera 110. Position translation module 330 may provide the corresponding camera movement data to INS module 340 for use with other sensor data.

INS module 340 may include hardware or a combination of hardware and software to determine a geographic position based on camera movement data from position translation module 330 and other sensor data (e.g., received from other sensors 130). In one implementation, INS module 340 may filter information from the camera movement data and the other sensor data to calculate a position using best-fit results. For example, INS module 340 may apply a Kalman filter to reduce noise and other inaccuracies from the camera movement data and the other sensor data, and to apply a best fit position.

Although FIG. 3 shows example functional components of computing device 160, in other implementations, computing device 160 may include fewer functional components, different functional components, differently arranged functional components, and/or additional functional components than depicted in FIG. 3. Alternatively, or additionally, one or more functional components of computing device 160 may perform one or more other tasks described as being performed by one or more other functional components of computing device 160.

Figure 4:
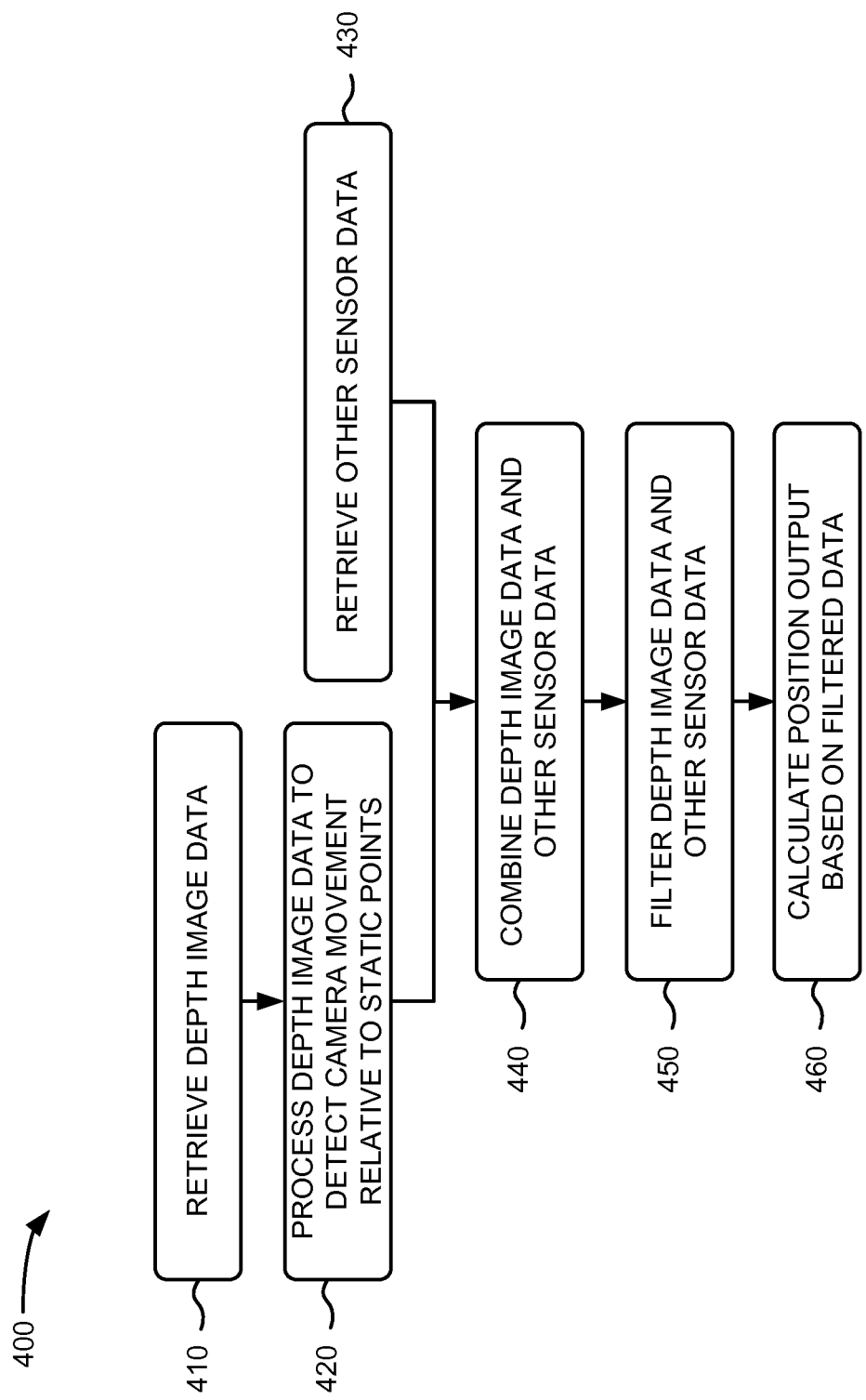
FIG. 4 is a flow diagram of an exemplary process for determining a geographic position using depth camera images to minimize drift.

FIG. 4 is a flow diagram of an exemplary process 400 for determining a geographical position using depth camera images to minimize drift. In one implementation, process 400 may be performed by computing device 160. In another implementation, process 400 may be performed by one or more other devices including or excluding computing device 160.

Process 400 may include retrieving depth image data (block 410). For example, depth image data module 310 may receive depth images (e.g., a sequence of frames from a depth image video) from depth sensing camera 110. Depth image data module 310 may forward depth image frames to image comparison module 320.

Process 400 may also include processing the depth image data to detect camera movements relative to fixed points (block 420). For example, image comparison module 320 may perform steps to identify moving objects and occluded objects in the depth images. Image comparison module 320 may also eliminate the moving and occluded objects to provide a clean comparison of static objects for comparison between successive frames. Image comparison module 320 may compare the static objects from the camera images to track the relative movements of points in a local environment. Position translation module 330 may translate relative movements detected by image comparison module 320 into corresponding movements of the depth sensing camera 110. Position translation module 330 may provide the corresponding camera movement data to INS module 340 for use with other sensor data. Implementations of process block 420 are described further below in connection with FIGS. 5-7.

Process 400 may further include retrieving other sensor data (block 430). For example, INS module 340 may retrieve sensor data relative to the reference object from sensors 130. Sensor data may include, for example, motion data (e.g., from an accelerometer), rotation data (from a gyroscope), and/or magnetic field data (from a magnetometer).

Process 400 may include combining the depth image data and the other sensor data (block 440), filtering the depth image data and other sensor data (block 450), and calculating a position output based on the filtered data (block 460). For example, INS module 340 may determine a combine the camera movement data from position translation module 330 and other sensor data (e.g., received from sensors 130). INS module 340 may filter information from the camera movement data and the other sensor data to calculate a position using best-fit results.

Figure 5:
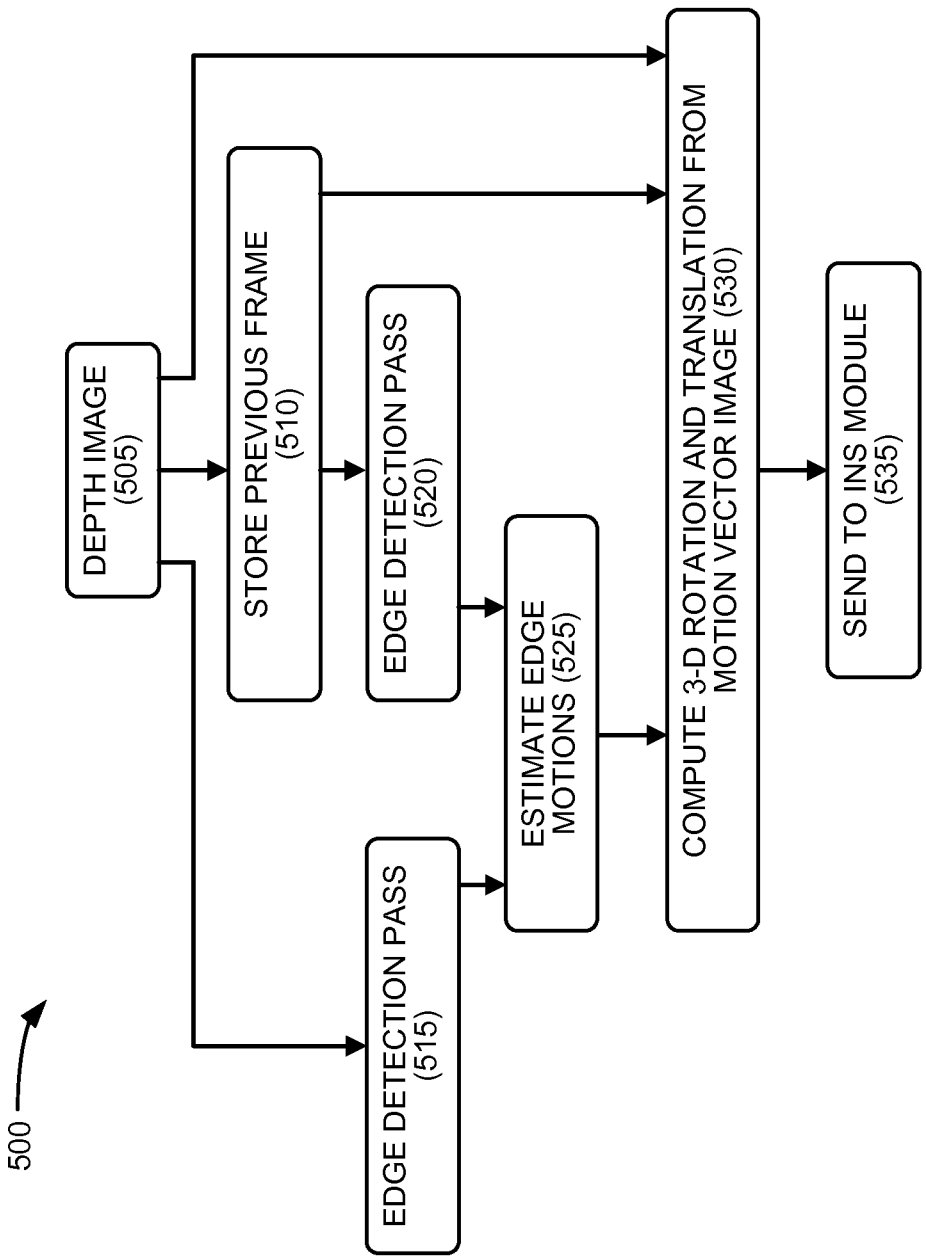
FIG. 5 provides an exemplary flow diagram for processing depth images according to an implementation described herein.

FIG. 5 provides an exemplary flow diagram 500 for processing depth images. Flow diagram 500 may correspond to process block 420, according to an implementation. FIG. 5 may provide steps for processing depth image data to detect relative camera movements by estimating changes in edge motions throughout an entire image.

Referring to block 505, image comparison module 320 may receive depth images (e.g., from depth image data module 310). Depth images may include, for example, a single frame from a depth image video.

Image comparison module 320 may detect relative movement based on comparisons between time-shifted frames received from depth image data module 310. As shown in block 510, image comparison module 320 may store a previous (e.g., earlier in time) frame for comparison with a current (e.g., most recently received) frame. As shown in block 515, image comparison module 320 may perform an edge detection pass on the current frame. The edge detection pass may include, for example, executing a procedure to define all the edges in the particular frame. In the context of depth images, an edge may be a discontinuity in depth of adjacent pixels or groups of pixels (in contrast with, for example, a discontinuity in color of a conventional image). Image comparison module 320 may perform a similar edge detection pass for the previous frame, as indicted by block 520.

As shown in blocks 525, image comparison module 320 may compare the edge detection results of the current frame (e.g., from block 515) with the edge detection results of the previous frame (e.g., from block 520). For example, image comparison module 320 may perform a block matching procedure or similar motion estimation technique to determine relative motion of objects within the current frame compared to the previous frame.

As shown in block 530, generally, image comparison module 320 may apply a transformation matrix to specify how an object has rotated, scaled, or moved between a previous frame and a current frame. More particularly, image comparison module 320 may utilize the fact that triangles can be built up from pixel sets where all distances in the triangle are known, since the depth image provides this information. The triangles may move between frames, and the new pixel coordinates can be known from the edge motion calculations (e.g., in block 525). All distances in the new triangle are also known from the new depth image. Image comparison module 320 may, thus, compute the transformation from a triangle in the previous frame to a triangle in the current frame. Image comparison module 320 may then determine a suitable mean transformation over several triangles.

Position translation module 330 may translate relative movements detected by image comparison module 320 into corresponding movements of the depth sensing camera 110 (block 530). As shown in block 535 of FIG. 5, position translation module 330 may provide the corresponding camera movement data to INS module 340 for use with other sensor data.

Figure 6:
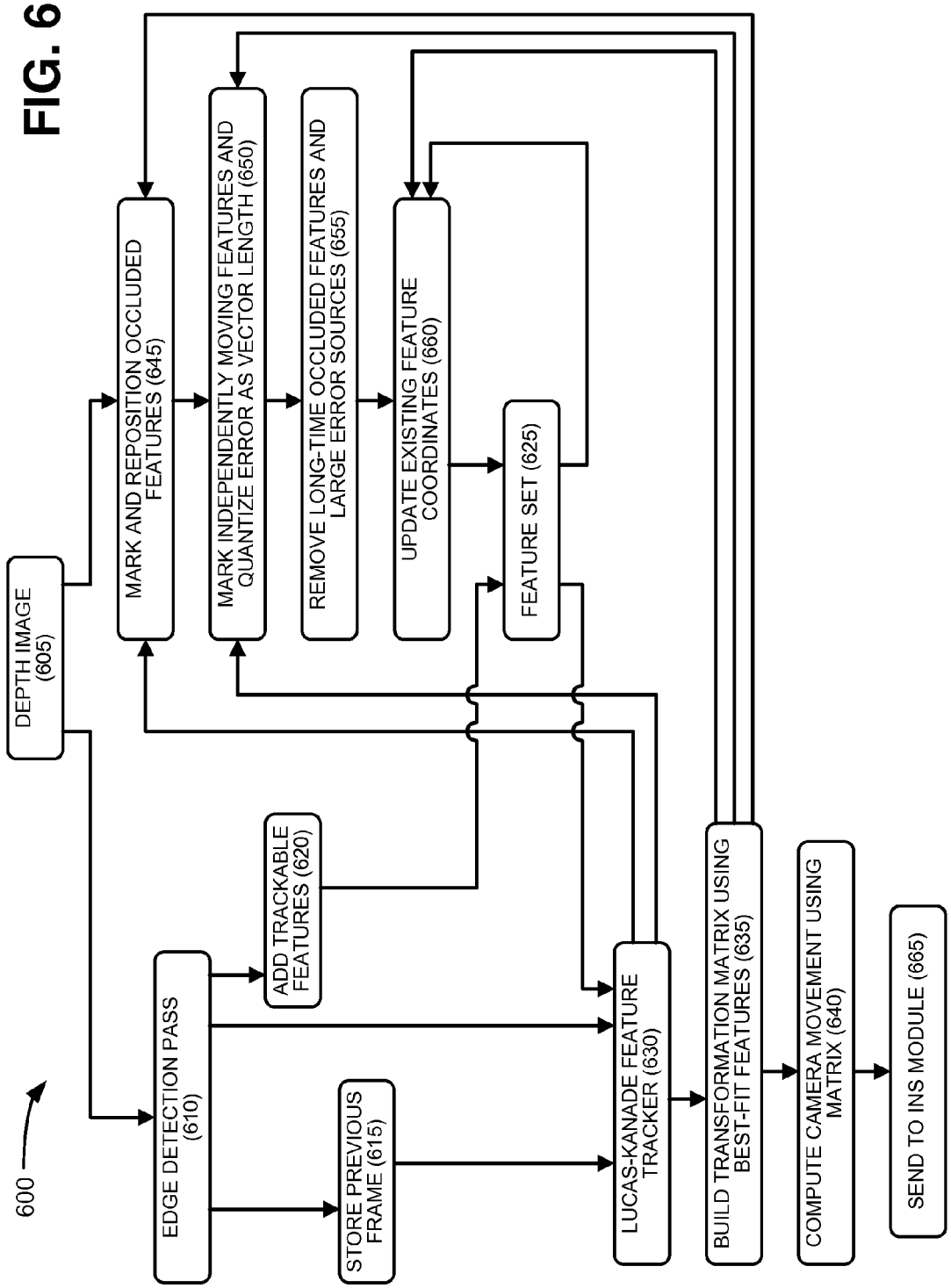
FIG. 6 provides another exemplary flow diagram for processing depth images according to an implementation described herein.

FIG. 6 provides another exemplary flow diagram 600 of processing depth images. Flow diagram 600 may correspond to process block 420, according to another implementation. FIG. 6 may provide steps for processing depth image data to detect relative camera movements by maintaining an active feature set and tracking feature movements across frames.

Similar to FIG. 5 described above, image comparison module 320 may receive depth images from depth image data module 310 (block 605). Depth images may include, for example, a single frame from a depth image video. As shown in block 610, image comparison module 320 may perform an edge detection pass on the current frame. The edge detection pass may include, for example, executing a procedure to define all the edges in the particular frame. Edge detection results may be stored as a previous frame for comparison purposes, as indicted by block 615.

As shown in block 620, image comparison module 320 may identify within the current frame trackable features of the image. For example, image comparison module 320 may apply a feature finder algorithm to detect known objects (e.g., faces, walls, furniture, etc.) in the current frame. Identifiable features may be added to a feature set (e.g., a data structure, such as a database), as shown in block 625.

Image comparison module 320 may use the set of known features (e.g., from feature set 625) to compare the previous frame (e.g., from block 615) with the current frame (e.g., from block 610). For example, shown in block 630, image comparison module 320 may identify features (from feature set 625) that are in the current image and in the previous image and track relative movement among common features. In one implementation, image comparison module 320 may apply a version of the Lucas-Kanade feature tracking method for determining optical flow. In other implementations, a different method for calculating optical flow between the current frame and previous frame may be used.

In block 635, image comparison module 320 may build a transformation matrix using a set of best-fit features from feature tracker 630. Similar to the transformation matrix described above with respect to block 530 of FIG. 5, the transformation matrix in block 635 may be used to specify how an object has rotated, scaled, or moved between a previous frame and a current frame. Image comparison module 320 may utilize the fact that triangles can be built to connect different features, where all distances in the triangle are known since the depth image provides this information. The triangles (e.g., each associated with the same features on each frame) may move between frames, and the new feature coordinates can be known, for example, from the edge motion calculations. All distances in the new triangle can also be known from the new depth image. Image comparison module 320 may compute the transformation from a triangle in the previous frame to a triangle in the current frame. Image comparison module 320 may then determine a suitable mean transformation over several triangles.

Position translation module 330 may translate relative movements detected by image comparison module 320 into corresponding movements of the depth sensing camera 110. As shown in block 665 of FIG. 6, position translation module 330 may provide the corresponding camera movement data to INS module 340 for use with other sensor data.

Image comparison module 320 may also include feedback to improve accuracy of the calculated camera movements. Referring to block 645, image comparison module 320 may take results from the feature tracker of block 630 and transformation matrix of block 635 to mark and reposition occluded features. Thus, image comparison module 320 may detect features in the previous frame(s) that have been blocked from view in the current frame (e.g., are behind another object). Image comparison module 320 may adjust the position of these occluded features according to the motions calculated in transformation matrix of block 635. Thus, the occluded features may be tracked to a current position even though the features are not actually seen by depth sensing camera 110.

In block 650, image comparison module 320 may mark independently moving features and quantize error as a vector length. When each feature is moved according to the transformation matrix, there may be a difference between the calculated location of the tracked feature and the actual location of the tracked feature (according to the depth image received in block 605). If the difference is above a particular threshold, image comparison module 320 may make an assumption that, for example, a particular feature is attached to a moving object (e.g., the feature is not static). For example, a feature identified on a car in a previous image may be identified as moving if the calculated feature position is significantly different from the movement of other features in the depth image, for example because the car is in motion.

Referring to block 655, if a feature is occluded for a particular time or a particular number of frames (as determined in block 645) the occluded feature may identified for removal from the active feature set. Similarly, if a feature has a large error vector (as determined in block 650), the error source feature may be identified for removal from the active feature set.

For the features that remain (e.g., after removal of the occluded and error features), image comparison module 320 may update the coordinates of the existing (remaining) features in the feature set of block 625 (according to the depth image received in block 605) if such features are occluded. The feature set of block 625 is thus updated with accurate positions and current features for comparison with a subsequent frame.

FIG. 7 provides another exemplary flow diagram 700 of processing depth images to detect relative camera movements by matching features within images. Flow diagram 700 also includes a process to incorporate feedback from the INS (e.g., INS module 340) into the relative camera movement calculations.

As show in block 705, image comparison module 320 may receive depth images from depth image data module 310. A depth image may include, for example, a single frame from a depth image video.

As shown in block 715, image comparison module 320 may apply a Graphics Processing Unit-Scale Invariant Feature Transform (GPU-SIFT) method to the depth image. GPU-SIFT is generally a computer vision process to detect and describe features in images. In block 715, image comparison module 320 may apply GPU-SIFT to detect features in the current depth image (e.g., from block 705).

As indicated in block 720, features identified in GPU-SIFT block 715 may be refined based on feedback from previous frames. As described further below, features identified in GPU-SIFT block 715 may be compared against a dynamic feature set (block 755) and INS output (block 785).

In block 725, image comparison module 320 may build a transformation matrix using a set of best-fit features from block 720. Similar to the transformation matrix described above with respect to block 635 of FIG. 6, the transformation matrix in block 725 may be used to specify how an object has rotated, scaled, or moved between a previous frame and a current frame.

Image comparison module 320 may also use feedback to improve accuracy of the calculated camera movements. Referring to block 730, image comparison module 320 may take results from the refined feature positions of block 720 and transformation matrix of block 725 to identify and transform occluded features. Thus, image comparison module 320 may track features in the previous frame(s) that have been blocked from view in the current frame (e.g., are behind another object). Image comparison module 320 may adjust the position of these occluded features according to the motions calculated in transformation matrix of block 725. Thus, the occluded features may be tracked to a current position even though the features are not actually seen by depth sensing camera 110.

In block 735, image comparison module 320 may mark independently moving features and quantize error as a vector length. When each feature is moved according to the transformation matrix, there may be a difference between the calculated location of the tracked feature and the actual location of the tracked feature (according to the depth image received in block 705). If the difference is above a particular threshold, image comparison module 320 may make an assumption that, for example, a particular feature is attached to a moving object (e.g., the feature is not static). For example, a feature identified as a car in a previous image may be identified as a moving car if the calculated feature (e.g., car) position based on camera movement is significantly different from what is shown in the depth image.

Referring to block 740, if a feature is occluded for a particular time or a particular number of frames (as determined in block 730) the occluded feature may identified for removal from the active feature set. Similarly, if a feature has a large error vector (as determined in block 735), the error source feature may be identified for removal from the active feature set.

As shown in block 745, features from the current depth image that were not in previous frames may be identified. In block 750, image comparison module 320 may update a set of features in the transformation matrix from block 725 based on occluded or removed features (e.g., from block 740) and the new features (e.g., from block 745). The additions/deletions may be included in the feature set of block 755. As shown in FIG. 7, the feature set of block 755 may be used as feedback for comparison with features of a next new frame (e.g., from GPU-SIFT block 715).

Referring to block 760, image comparison module 320 may compute a translation to the camera (e.g., depth sensing camera 110) for each of the individual features in the feature set of block 755. For example, image comparison module 320 may apply the position of features in the remaining feature set of block 755 to determine an associated movement of depth image camera 110 that would be required to cause the changes of the individual features.

The translation information for depth image camera 110 (e.g., from block 760) may be input to INS module 340, depicted as block 780 in FIG. 7. As shown in block 780, INS module 340 may also receive accelerometer data (block 765), gyroscope data (block 770), and magnetometer data (block 765). INS module 340 may process the camera translation information, the accelerometer data, the gyroscope data, and the magnetometer data to calculate a dead-reckoning position for computer-aided navigation system 100, as shown in block 790.

As further shown in block 780, INS module 340 may also feed the output position data back to image comparison module 320, as indicated in block 785, to minimize error. Image comparison module 320 may translate/update feature locations, based on the differences in the output position data from INS module 340, and forward the updated feature information to the refined feature positions of block 720. As shown in FIG. 7, both the feature set of block 755 and the translated feature locations of block 785 may be used to refine feature positions in block 720. The multiple feedback loops may be used, for example, to account for differences in the frames-per-second rate of depth sensing camera 110 and the refresh rate INS module 340. For example, if the update rate of INS module 340 is faster than the frame processing rate of image comparison module 320, INS module processing in block 780 may provide multiple updates before receiving updates from feature set 755.

CONCLUSION

Systems and/or methods described herein may utilize depth camera images to provide increased precision for inertial navigation systems. Moving objects and occluded object may be eliminated from the depth images to provide a clean comparison of static objects between successive frames. The depth camera images may be compared in sequence to track the movements of points in a local environment, and the movements may then be translated into corresponding movement of the depth camera. The corresponding camera movement may be provided with other sensor data for use by the inertial navigation system.

The foregoing description of implementations provides illustration, but is not intended to be exhaustive or to limit the implementations to the precise form disclosed. Modifications and variations are possible in light of the above teachings or may be acquired from practice of the teachings.

In the above, while series of blocks have been described with regard to the exemplary process, the order of the blocks may be modified in other implementations. In addition, non-dependent blocks may represent acts that can be performed in parallel to other blocks. Further, depending on the implementation of functional components, some of the blocks may be omitted from one or more processes.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving, by a computing device and from a depth camera associated with a reference object, depth image data including objects in a first frame and in a second frame;
processing, by the computing device, the depth image data to detect changes in relative positions of the objects in the first frame and in the second frame;
translating, by the computing device, the changes in relative positions into corresponding movement data of the depth camera;
obtaining, by the computing device, sensor data associated with the reference object;
filtering, by the computing device, the corresponding movement data and the sensor data; and
calculating, by the computing device, a geographic position of the reference object based on the corresponding movement data and the sensor data.

2. The method of claim 1, wherein processing the depth image data comprises:
detecting edges of the objects in the first frame,
defining triangles between portions of edges within the first frame,
detecting edges of the objects in the second frame, defining triangles between the portions of the edges within the second frame, and calculating a mean transformation over the triangles of the first frame and the triangles of the second frame to determine the changes in the relative position.

3. The method of claim 1, wherein processing the depth image data comprises:

defining a feature set based on the first frame and the second frame, identifying common features in the feature set that are in both the first frame and the second frame, tracking relative movement, of the common features, between the first frame and the second frame, and calculating a mean transformation of the relative movement to determine the changes in the relative position.

4. The method of claim 3, wherein processing the depth image data further comprises:

removing, from the feature set, features associated with non-static objects.

5. The method of claim 1, wherein processing the depth image data comprises:

detecting features of the objects in the first frame, defining a feature set based on the features of the objects in the first frame, detecting features of the objects in the second frame, and updating the feature set based on the features of the objects in the second frame.

6. The method of claim 5, wherein processing the depth image data further comprises:

updating the feature set based on the calculated geographic position of the reference object.

7. The method of claim 1, wherein the computing device includes an inertial navigation system (INS).

8. The method of claim 1, wherein the depth camera associated with the reference object is included in an augmented reality (AR) visor.

9. The method of claim 1, wherein the sensor data associated with the reference object includes:

accelerometer data, gyroscope data, or magnetometer data.

10. The method of claim 1, wherein processing the depth image data comprises:

extracting, from the depth image data, objects that are moving relative to the reference object and objects that are occluded in the second frame.

11. A position-determining device, comprising:

a depth camera to generate depth images relative to a reference object;

a sensor to generate sensor data, wherein the sensor data includes one or more of motion data, rotation data, and magnetic field data relative to the reference object;

a transmitter to send the depth images and the sensor data to a processing component;

a receiver to receive the depth images and the sensor data; and the processing component being configured to:

detect changes in relative positions of objects in the depth images, translate the changes in relative positions into corresponding movement data of the camera, and calculate a position of the reference object based on the sensor data and the calculated corresponding movement data of the camera.

12. The position-determining device of claim 11, wherein the processing component includes an inertial navigation system (INS).

13. The method of claim 1, wherein the reference object comprises:

a smart phone, a tablet computer, or an augmented reality (AR) visor.

14. The method of claim 1, wherein the filtering the corresponding movement data and the sensor data further comprises:

filtering the corresponding movement data and the sensor data using a Kalman filter.

15. The method of claim 1, wherein the receiving depth image data comprises receiving the depth image data via:

a Bluetooth interface, a near-field communications (NFC) interface, a WiFi interface, or a wired interface.

16. The position-determining device of claim 11, wherein the reference object comprises a mobile computing device.

17. The position-determining device of claim 11, wherein, when detecting changes in relative positions of objects in the depth images, the processing component is further configured to:

detect edges of the objects in a first frame, define triangles between portions of the edges within the first frame, detect the edges of the objects in a second frame, define triangles between the portions of the edges within the second frame, and calculate a mean transformation over the triangles of the first frame and the triangles of the second frame to determine the changes in the relative position.

18. The position-determining device of claim 11, wherein, when detecting changes in relative positions of objects in the depth images, the processing component is further configured to:

define a feature set based on a first frame and a second frame, identify common features in the feature set that are in both the first frame and the second frame, track relative movement, of the common features, between the first frame and the second frame, and calculate a mean transformation of the relative movement to determine the changes in the relative position.

19. The position-determining device of claim 18, wherein, when detecting changes in relative positions of objects in the depth images, the processing component is further configured to:

remove, from the feature set, features associated with non-static objects.

* * * * *